United States Patent [19]

Loughlin

[11] Patent Number: 5,980,597
[45] Date of Patent: Nov. 9, 1999

[54] COLOR STABLE COATED ABRASIVES

[75] Inventor: Bernard Loughlin, Averill Park, N.Y.

[73] Assignee: Norton Company, Worcester, Mass.

[21] Appl. No.: 09/057,834

[22] Filed: Apr. 9, 1998

[51] Int. Cl.$^6$ .............................. B24D 11/00; B24D 3/28; C09K 3/14

[52] U.S. Cl. ................. 51/295; 51/298; 51/307; 51/309

[58] Field of Search .............................. 51/295, 298, 307, 51/309

[56] References Cited

U.S. PATENT DOCUMENTS

| | | | |
|---|---|---|---|
| 3,787,273 | 1/1974 | Okrepkie et al. | 51/295 |
| 4,035,961 | 7/1977 | Pemrick et al. | 51/298 |
| 4,214,877 | 7/1980 | Pemrick | 51/298 |
| 4,588,419 | 5/1986 | Caul et al. | 51/298 |
| 4,867,760 | 9/1989 | Yarbrough | 51/298 |
| 5,011,513 | 4/1991 | Zandor et al. | 51/295 |
| 5,232,468 | 8/1993 | Broberg et al. | 51/295 |
| 5,595,578 | 1/1997 | Stubbs et al. | 51/295 |

*Primary Examiner*—Michael Marcheschi
*Attorney, Agent, or Firm*—David Bennett

[57] ABSTRACT

A coated abrasive comprising maker and size coats with improved color stability is obtained by the use of a bisphenol/formaldehyde resin binder in either the maker or, more preferably, the size coat.

5 Claims, No Drawings

COLOR STABLE COATED ABRASIVES

BACKGROUND OF THE INVENTION

The present invention relates to coated abrasives and particularly those made using a phenol/formaldehyde binder in either a maker or size coat.

A coated abrasive is conventionally made by application of layer of a binder resin, (called a maker coat), to a backing material followed by a layer of abrasive grits and then at least partial cure of the resin binder to anchor the grits to the backing. A size coat is then typically applied over the abrasive grits and the cured. The main function of the size coat is to improve the retention of the abrasive particles to the substrate. In some cases it is advantageous to apply over the size coat a further layer comprising a binder and a functional additive such as a grinding aid, a lubricant or an antistatic agent. The binder resin used in each layer is frequently the same to avoid compatibility problems potentially associated with the use of dissimilar resins.

The most commonly used binder resins, particularly where abrasive grits with hydrophilic surfaces such as alumina-based abrasives are used, are phenolic resins. These have many very significant virtues such as hardness, adaptability, water-dispersibility and relatively low cost. They do however have a disadvantage that can be a practical problem. Many manufacturers prefer to associate at least some of their products with a particular color which is added in the form of a dye or pigment added to the binder formulation for at least the size coat. With such a commercial strategy, it is important that the color remain essentially constant from one production run to the next and within the same run. Unfortunately however resole resins, which are base catalyzed, in the presence of oxygen undergo over time a partial oxidation to form quinone derivatives which have a reddish color. This interferes with the added color and, since the degree of interference depends on the age of the resole and the degree of oxidation it has experienced, the extent of the interference, and therefore the resultant shade of the product, will vary significantly.

One way in which this problem has been approached in the past is the incorporation of a second binder component, such as a melamine resin, that inhibits the oxidation. This however is not a perfect solution because it leads to mixture stability problems and a consequent reduction in shelf life of the binder blend. Alternatively it has been suggested that an ammonium salt, such as ammonium aluminum fluoride or ammonium hydrogen fluoride, be incorporated in the binder. This is the approach advocated in U.S. Pat. Nos. 5,110,320 and 5,232,468. Quite substantial amounts of the additive are required however with up to about 40% by weight of the total alkali metal catalyzed phenolic resin being taught. This too can lead to compatibility and shelf life problems.

A novel approach to this problem has now been devised which avoids the need to load up the binder resin formulation with additives. The novel approach uses a binder with the virtues of phenolic resin binders but with significantly enhanced color stability. As an added bonus, the strong odor of phenol which characterizes many coated abrasives operations using phenolic binders is significantly reduced.

DESCRIPTION OF THE INVENTION

The present invention provides a coated abrasive comprising a backing material and abrasive grains adhered to the backing material by means of a maker coat and a size coat wherein each of said coats comprises a binder resin and at least one of said coats uses as the binder resin a bisphenol/formaldehyde resin.

In the context of this specification it is understood that the term "bisphenol" indicates a compound having the formula:

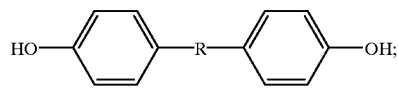

wherein "R" indicates a substituted or unsubstituted hydrocarbyl group, particularly one having from 1 to 6 carbon atoms. The most frequently encountered examples of such bisphenols are bisphenol F wherein the R group is —$CH_2$—; and bisphenol A wherein the R group is $C.(CH_3)_2$—. The preferred bisphenol components used to make the binders for the process of the invention have formulae in which the group R has from 1 to 4 carbon atoms and is most preferably unsubstituted.

These bisphenols react with formaldehyde in a base-catalyzed reaction in the same way as phenol except for the presence of two phenolic hydroxyl groups on the molecule rather than one. Most importantly however, because of the structure of the molecule, there is no possibility of developing the highly colored quinone structures that cause the problems discussed above. The resultant resins however are similar in the relevant properties to those made with phenol/formaldehyde, (P/F), resins.

Suitable and preferred bisphenol/formaldehyde resins are available from Oxychem and bear the CAS number 25085-75-0. Suitable resin formulations generally comprise from 70 to 75% solids of the resin, (measured after standing at 135° C. for 3 hours) in an aqueous medium and have a viscosity at 25° C. of 1100–1300 cps. The phenolic group/formaldehyde ratios are generally equivalent to those used in conventional P/F resins. Also the preferred amount of base catalyst, (usually an alkali metal hydroxide), is usually calculated on an equivalent basis to that used in P/F resins. The curing proceeds by the same route and at roughly the same temperatures that are conventional for P/F resins.

In a preferred process according to the invention the bisphenol/formaldehyde resin binder is used only in the size coat. It can also however be used in both maker and size coats and optionally also in any supersize coat employed.

It is also found that color stabilization is enhanced by the presence of an organophosphite light stabilizing additive in the formulation.

DESCRIPTION OF PREFERRED EMBODIMENTS

The invention is now described with specific reference to the following Examples which are presented solely for the purpose of illustrating the invention and are intended to imply no essential limitation on the scope of the invention.

Evaluation Procedures

In evaluating coated abrasives according to the invention most attention is paid to the color stability of the binder formulation. To provide an adequate basis for the comparison two belts were prepared using a size formulation which contained an aqueous bisphenol/formaldehyde resin dispersion. The maker coat employed a conventional P/F resin. A conventional belt made using the same formulation and production process except for the use of an equivalent solids weight formulation comprising a P/F resin for the size coat invariably became discolored during firing. To provide a more challenging basis for comparison a commercial belt made with a color stable size coat formulation comprising a conventional mixture of melamine and P/F resins was used. Only this formulation of the size coat was different between the products evaluated. In each case the backing, abrasive grit, (36 grit fused alumina), maker coat and curing schedules were all the same.

The bisphenol resin used was obtained from OxyChem under the CAS number 25085-75-0 and employed a bisphenol having the formula 4,4'-(1-methyl-ethyliden)bis [phenol]. The resin had a viscosity at 25° C. of 1100–1300 cps and a percentage solids content after standing 3 hours at 135° C. of 71–74. The water solubility of the resin at 25° C. was 200–500%. The formulation evaluated also contained minor amounts of glycerol as a plasticizer, dipropylene glycol to inhibit blistering during cure, and an organophosphite light stabilizer.

Cure of the size coat was initiated using a cure schedule as follows: 20 minutes at 76.7° C.; 20 minutes at 87.8° C.; 20 minutes at 98.9° C.; and 20 minutes at 107.2° C. Finally the samples are given a 12 hour heat soak at 112.8° C. with the color being evaluated after 8 hours and after the full 12 hours. This production process exactly paralleled the production process for the commercial belt.

A satisfactory product shows little or no difference in color between the color before the heat soak and after the heat soak. The products made according to the invention showed little or no difference in color after the full 12 hours of heat soak and were equivalent to the commercial product.

Abrasive belts were prepared from samples of 2 rolls of product produced under similar conditions with the Bisphenol resin formulations size coat and tested for abrasive efficiency against belts incorporating the the commercial color stable size adhesive system which were produced in the same factory manufacturing run. The belts were tested according to the following procedures.

122Ds

In this test the applied force is 40–80 psi, (276–552 Knewtons/m$^2$) depending on the grit size evaluated and the test material is a 1"×1"×36" (2.54×2.54×91.4 cm), 4140 cold drawn steel bar.

The abrasive sample belt is mounted on a 90 Durometer plain faced rubber contact wheel and is run at a rate of 5000 surface feet/minute (1524 surface meters/minute)

The test piece holder is adapted to force the 1" square (6.45 cm$^2$) end into contact with the moving abrasive surface with a force of 40 to 80 psi, (276–552 Knewtons/m$^2$), depending on the grit size. The force is applied and removed to allow a 3 second grinding interval followed by a thirty second cooling period. The test is ended when the cut per cycle falls below 0.030 inch, (0.076 cm.), per minute or the completion of 90 cycles, whichever comes first. The amount of metal removed per cycle, the number of cycles and the total amount of metal are recorded. The applied weight could be varied with the grit size as desired.

102Ds

This test is performed on 4140 steel. The equipment used comprises motor driven apparatus upon which an abrasive belt to be tested is mounted. In this test the belt is brought into contact with the workpiece. Belt speed is 5000 surface feet per minute, (1525 surface meters/minute).

In this configuration, the belt is brought into contact with a 0.5"×3"×9.75", (1.27×7.62×24.80 cm), metal bar. The force applied was 32 psi (221 Knewtons/m$^2$). The bar is abraded on its 0.5×3" (1.27×7.62 cm) face in a conventional back and forth grinding motion for a two minute period after which the bar is allowed to cool. In the grinding cycle the bar is oscillated at a rate of 7 feet per minute, (2.13 meters/minute). The amount of metal removed during the grinding cycle is measured and the cycle is then repeated until the cut per cycle falls below 3 gm/minute for 4140 steel.

701Dsm

This procedure is designed to evaluate coated abrasive performance when in a plunge grinding environment at a controlled feed rate. In this test the rate of metal removal is always constant and the pressure between the backup wheel and the test bar is varied to maintain the metal removal rate constant.

The desired metal removal rate and the infeed rate are programmed into a control computer and the test bar is mounted to a horizontally moving fixture in which the bar is clamped during the test and which supplies the predetermined advance during the 30 second cooling periods. The equipment measures the pressure generated between the work piece and the backup wheel, the horsepower generated, and the resulting temperature of the bar.

The test is terminated when the pressure reaches a level which usually correlate to burn of the workpiece. Performance evaluation correlates to the number of cycles completed before the evaluation is terminated. Control belts made by commercial processes similar to those used to make the test belts were evaluated side-by-side with the test belts.

DIVss

This test is very similar to the "701" test described above. In this procedure the amount of metal to be removed and the crossfeed speed are programmed into the controls. The standard running speed was 5100 surface feet per minute, (1554 surface meters/minute), and the contact wheel is a 90 Durometer plain face rubber. The test bar is a 304 stainless steel. In the test the normal force and the number of passes before termination are measured.

The results are set forth in Table 1 below.

| TEST | Roll-1 | Roll-2 |
| --- | --- | --- |
| ADHESION | 97% | 96% |
| 122Ds | 93% | 100% |
| 102Ds | 98% | 97% |
| DIVss | 117% | 108% |
| 701Dsm | 116% | 94% |

The above results are expressed in percentages of the performance observed for the conventional color stable commercial belt in tests according to the procedures identified.

It will be noted that although the comparison product was a fully commercialized and therefore optimized version, whereas the product according to the invention was not fully optimized, the results obtained were generally at least comparable. Thus substitution of the bisphenol for a phenol/melamine mixture in the size coat binder therefore made little difference to the overall grinding performance.

What is claimed is:

1. A coated abrasive comprising a backing material and abrasive grains adhered to the backing material by means of a maker coat and a size coat applied over the abrasive grains wherein each of said coats comprises a binder resin and at least one of said coats uses as the binder resin a bisphenol/formaldehyde resin.

2. A coated abrasive according to claim 1 wherein the size coat comprises the bisphenol/formaldehyde resin.

3. A coated abrasive according to claim 1 wherein the bisphenol/formaldehyde resin is produced using bisphenol in which the group linking the phenol groups of the bisphenol component is a hydrocarbyl radical having from 2 to 4 carbon atoms.

4. A coated abrasive according to claim 1 wherein the bisphenol/formaldehyde resin is produced using bisphenol in which the group linking the phenol groups is a 1-methyl-ethylidene group.

5. A coated abrasive according to claim 1 wherein the bisphenol/formaldehyde binder also comprises an organophosphite stabilizer.

* * * * *